July 31, 1962
J. S. WILKERSON
3,046,795
CONTROL APPARATUS
Filed Dec. 27, 1960
2 Sheets-Sheet 1
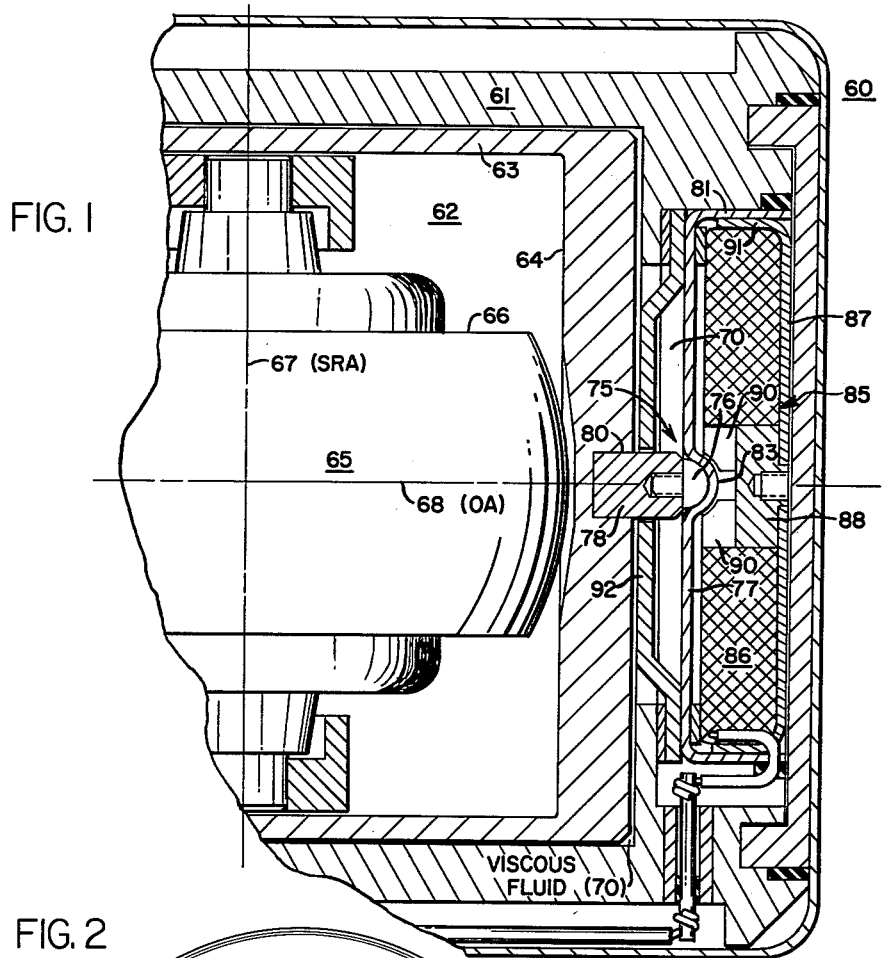
FIG. I
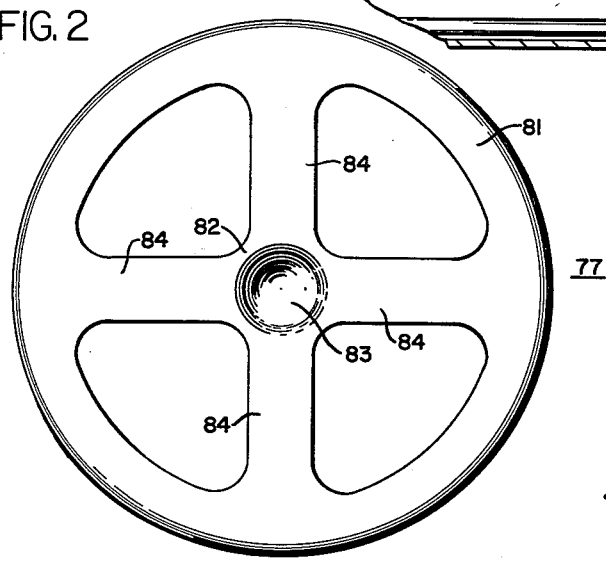
FIG. 2
INVENTOR.
JOHN S. WILKERSON
BY Roger W. Hensen
ATTORNEY INVENTOR.
JOHN S. WILKERSON
BY Roger W. Hensen
ATTORNEY United States Patent Office 3,046,795
Patented July 31, 1962

3,046,795
CONTROL APPARATUS
John S. Wilkerson, Overland Park, Kans., assignor to Minneapolis-Honeywell Regulator Company, Minneapolis, Minn., a corporation of Delaware
Filed Dec. 27, 1960, Ser. No. 78,404
9 Claims. (Cl. 74—5)

This invention generally pertains to sensitive instruments and more specifically pertains to the reduction of friction in a pivotal support for a sensitive instrument. The present invention has special although not exclusive application to the general field of floated inertial instruments such as floated integrating gyroscopes and floated accelerometers.

In floated instruments there is usually an element identified as a gimbal which in the case of an integrating gyroscope contains a gyro spin motor and in the case of an accelerometer has an eccentric mass element.

The gimbal is adapted to be supported for rotation relative to a housing by a viscous fluid in combination with delicate bearing means for defining a pivotal axis. The accuracy of these devices is largely dependent on the level of friction in the bearing for the gimbal. Previout arrangements for reducing friction between the gimbal and its support have been tried including means for having oscillatory rotation between the parts of the bearing. Another arrangement has been to have oscillatory axial movement between the two parts of the bearing. Generally these prior art arrangements have involved the use of the principle of compound sliding but generally have not been found fully successful due to a continuing engagement or contact between the two relatively rotatable parts of the bearing. This has been evident by a relatively high friction level evidenced by the devices being slow to return to their null signal producing position after first being displaced away from the null position.

The present invention overcomes the problems of the prior art arrangements as above described by the utilization of a unique axially oscillatory arrangement between a pair of relatively rotatable bearing elements, the present arrangement simultaneously axially oscillating two bearing elements in combination with the elements having a unique configuration which in coaction with fluid means causes the fluid means to be pumped between the bearing elements so as to develop fluid forces which react against the bearing elements to maintain them out of engagement or contact with one another.

It is an object of this invention to provide an improved control apparatus.

Another object of this invention is to provide an improved sensitive instrument, more specifically to provide a rotational support for a sensitive instrument having practically no friction between relatively rotatable parts of the support.

Another object of the invention is to provide a low-friction pivotal support for a sensitive instrument involving a unique pivotal bearing with means for axially oscillating the parts of the bearing and for pumping fluid means between the parts of the bearing.

These and other objects of the invention will become apparent from a reading of the accompanying specification and claims in conjunction with the drawings in which:

FIGURE 1 is a cross-sectional view of part of a floated integrating gyroscope embodying the present invention;

FIGURE 2 is a plan view of a resilient armature element which functions as one of the bearing elements for the gyroscope depicted in FIGURE 1;

Figure 3:
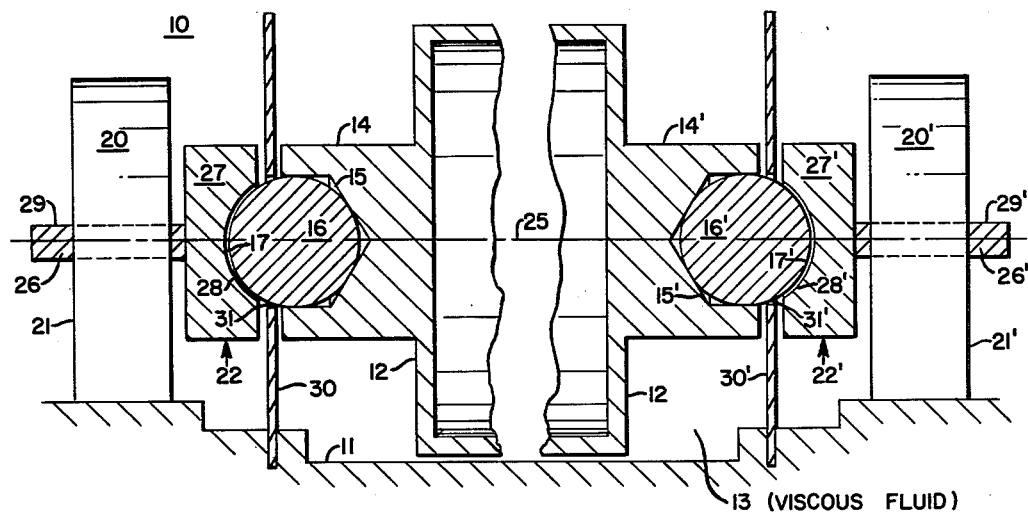
FIGURE 3 is a schematic representation of a sensitive instrument embodying the principles of the present invention.

Referring to FIGURE 3, the reference numeral 10 generally depicts a sensitive instrument and comprises a base or housing member 11 and a gimbal member 12. The gimbal 12 would contain a gyro spin motor in cases where the sensitive instrument was a floated integrating gyroscope or could be pendulous in the case of a floated linear accelerometer. Viscous fluid means identified only by the reference numeral 13 in FIGURE 3 would be contained within housing member 11 and surrounding gimbal 12. The viscous fluid generally would have a density substantially equal to the density of the gimbal member 12 so as to support it in substantially neutral suspension.

Each end of the gimbal assembly or member 12 has a central axially extending shoulder portion identified by the reference numerals 14 and 14'. The shoulders 14 and 14' respectively have a recess 15 and 15' in which are secured as by a press-fit arrangement a spherically shaped bearing element 16 and 16'. It will be understood that the bearing elements 16 and 16' are firmly connected to the gimbal member 12 so that there can be no relative movement therebetween. The depths of the recesses 15 and 15' are selected so that a substantial portion of the spherically shaped elements 16 and 16' project axially away or out of the gimbal member 12 leaving exposed convex surfaces 17 and 17' respectively. More specifically, the convex surfaces 17 and 17' are generally hemispherical in shape. Motor means 20 and 20' are provided including stator means 21 and 21' respectively connected in part to the housing member 11 and further comprising an armature element 22 and 22' respectively adapted to be axially oscillated along an axis generally designated by the reference numeral 25, axis 25 also being aligned with or parallel to the output axis or rotational axis of the gimbal member 12 relative to the housing member 11. More specifically, the armature elements 22 and 22' have a central shaft-like portion 26 and 26' respectively. The motor means 20 and 20' have suitable apertures 29 and 29' for receiving the shaft portions 26 and 26' respectively of the armature elements 22 and 22'. The armature elements 22 and 22' further include a bearing or pivot receiving element 27 and 27' each having therein a generally concave recess 28 and 28'. More specifically the concave recesses 28 and 28' are generally partial spherical surfaces. The pivot receiving portions 27 and 27' of the armature elements 22 and 22' are adapted to be positioned with respect to the projected hemispherical or convex surfaces 17 and 17' of the bearing elements 16 and 16' respectively so that the surfaces 17 and 17' generally nest within the recesses 28 and 28' respectively. Generally the surfaces 17 and 17' are shaped to conform to the concave surfaces 28 and 28'.

Baffle elements are positioned between the gimbal assembly 12 and the oscillation producing means 20 and 20'. These baffles are identified by reference numerals 30 and 30' and include a thin plate-like element having apertures 31 and 31' respectively therein to permit the projection therethrough of the outwardly extending portions 17 and 17' of the bearing elements 16 and 16' respectively. The plate elements 30 and 31' are secured by some suitable means to the base member 11.

In operation the motor means 20 and 20' are effective to cause axial oscillation or reciprocation of the armature elements 22 and 22' along the axis 25 and are effective to develop fluid forces which tend to maintain the bearing element 27 out of engagement with its coacting bearing element 16 attached to the gimbal as well as maintaining the coacting bearing elements 27' and 16' out of engagement.

Figure 4A:
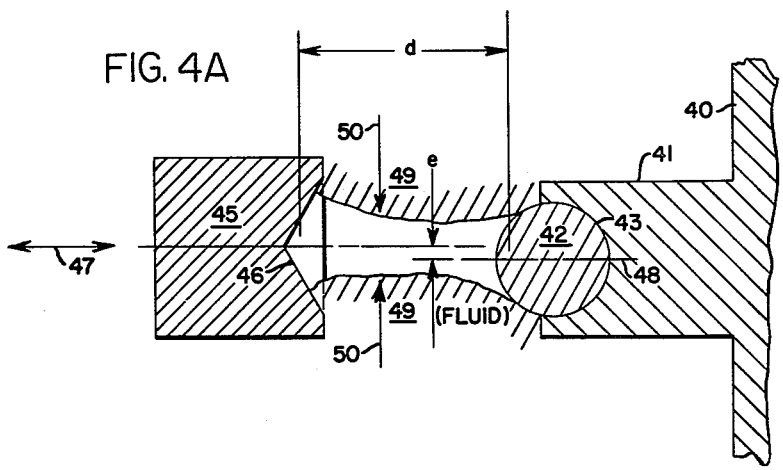
FIGURE 4A is a schematic representation of a bearing element embodying the teachings of the present invention in a first position.
Figure 4B:
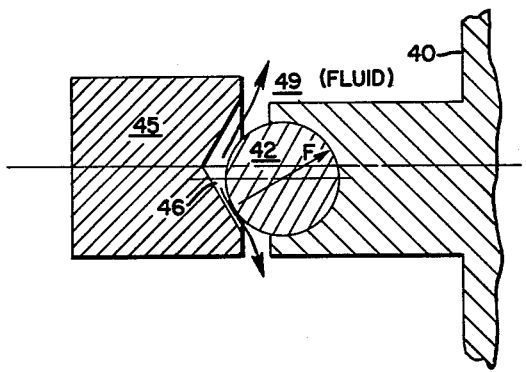
FIGURE 4B is a showing of the bearing depicted in FIGURE 4A in a second position.

For an understanding of the general theory of operation of the present invention, reference may be made to FIGURES 4A and 4B. A gimbal member identified by the reference numeral 40 is provided and has a central shoulder 41 with a spherically shaped bearing element 42 securely positioned within a suitable recess 43 thereof. A socket member 45 analogous to the armature assemblies 22 and 22' is provided and has a concave recess 46, the specific form of the concave recess being conical. The socket 45 is adapted to be axially oscillated by suitable motor means, not shown, along an oscillatory axis 47. In FIGURE 4A the output axis of the gimbal is identified by the reference numeral 48. The output axis is parallel to the oscillatory axis 47 but spaced a slight distance (e) therefrom. The dimension (e) may also be considered to be the eccentricity of gimbal axis or output axis 48 with respect to oscillatory axis 47. This is due to the fact that the gimbal can never be perfectly floated by the viscous fluid and either is slightly overfloated or slightly underfloated. In FIGURE 4A the bearing elements 42 and 45 are shown with their axial spacing (d) greatly exaggerated. In one arrangement, the clearance between the elements at the point of closest contact is approximately 100 micro inches and the socket travel is ±.300 inch. In FIGURE 4A the bearing element 45 has just been axially displaced to the left causing cavitation adjacent the exposed face of bearing element 42. The flow of fluid in the direction of the arrows 50 into the cavity is nearly symmetrical because the distance (d) is substantially larger than the eccentricity (e). In FIGURE 4B the bearing element 45 has been moved by the motor means, not shown, to the right on a compression stroke relative to the spherically shaped bearing element 42. During the compression stroke fluid 49 is forced away from the point of closest contact between the spherically shaped element 42 and the conical portion 46 resulting in a high pressure region at the point of closest contact. This produces a resultant force F acting perpendicular to the surface of the bearing element 42 at the point of closest contact. The force F acts through the bearing element 42 and has a radial (upward in FIGURE 4B) component tending to lift the gimbal 40 upwardly as shown in FIGURE 4B with respect to the bearing element 45. Before the bearing elements 42 and 45 actually contact one another, the socket element 45 is moved again to the left on an intake stroke. Due to the cavitation on the intake stroke, there is little un-centering during this part of the cycle.

The frequency of oscillation between the bearing elements 42 and 45 may vary according to various parameters. A 400 cycle per second energization of the oscillatory means producing 800 cycles of oscillation per second has been found satisfactory. The bearing arrangement depicted in FIGURE 3 results in the almost complete elimination of friction between the gimbal member 12 and the housing member 11.

The baffles 30 and 30' in FIGURE 3 are provided where desired in order to minimize currents in the fluid 13 from being produced and reacting with the gimbal member 12 so as to create extraneous torques acting thereon.

Referring now to FIGURES 1 and 2 where a preferred embodiment of the invention is depicted, in FIGURE 1 the reference numeral 60 generally designates a partially cutaway floated integrating gyroscope including a housing member 61 and a gimbal assembly 62. The gimbal assembly includes a hollow cylindrically shaped member 63 having an end wall 64 thereon. Due to the scale, only the right hand side of the instrument 60 is depicted. In FIGURE 1, a gyro spin motor generally identified by the reference numeral 65 is positioned within the gimbal 62 and includes in part a rotor element 66 adapted to be rotated by suitable means not specifically identified about a spin reference axis (SRA) 67.

The gimbal is adapted to be supported for rotation about an output axis (OA) generally identified by the reference numeral 68 which is substantially perpendicular to the SRA 67. The support of the gimbal for rotation about the OA 68 is primarily due to flotation of the gimbal assembly 62 by a viscous fluid 70 surrounding the gimbal assembly 62. Some of the gimbal support is provided by a pair of unique bearing assemblies, only one of which is shown in FIGURE 1, it being identified by the reference numeral 75. The two bearing assemblies define the exact rotational axis or output axis 68 of the gimbal. It will be understood that a pair of these assemblies would generally be provided analogous to the arrangement depicted in connection with FIGURE 3.

More specifically in FIGURE 1 the bearing assembly 75 includes a pivot element 76 and a pivot receiving element 77. The pivot element 76 has a convex shape more specifically generally hemispherical and is securely attached to a short shaft element 78 which is in turn securely mounted in a suitable central recess 80 in the end wall 64 of the gimbal assembly 62.

The pivot receiving element 77 is shown in plan view in FIGURE 2 and generally has a cup-like configuration including a continuous rim portion 81 and a central section 82 with a hemispherical recess or concave recess 83 therein. A plurality of spokes or arms 84 extend outwardly from the central portion 82 to the outer rim 81. The pivot receiving element 77 is adapted to be made out of a resilient material such as cold drawn, low carbon sheet steel and also is characterized by being magnetically permeable.

The pivot receiving element 77 also may be identified as the armature element of a motor means which is generally identified by the reference numeral 85 which includes a suitable coil means 86 centrally mounted with respect to a magnetic core structure including a cup-like element 87 and a central pole 88. The pole 88 has a plurality of pole faces 90 with the elements 90 collectively defining a generally spherical recess located adjacent to the recessed portion 83 of the armature element 77. The coil 86 generally surrounds the pole 88 with its pole faces 90 and the rim portion 81 of the armature element 77 is positioned so that it generally encompasses a flanged portion 91 of the cup-like element 87. The entire motor means is suitably attached to one end of the housing 61. The normal resiliency of the bearing element or armature 77 biases it away from engagement with the pole elements 90 of the motor means. This in turn tends to bias the hemispherically shaped recess 83 of the armature element 77 toward the outwardly extending hemispherically shaped bearing element 76. In operation the coil means 86 is energized by a suitable alternating voltage. Every time magnetic flux is produced by the coil means 86, it tends to flow through a megnetic circuit including the cup element 87, pole piece 88, pole elements 90 and the bearing element or armature element 77. It will be understood that when the flux flows through the above-described circuit there will be a tendency for the center portion 83 of the bearing element 77 to be pulled to the right as depicted in FIGURE 1 tending to close the gap between it and the pole elements 90 of the pole 88. As the flux decreases, then the natural resiliency of the bearing element 77 will tend to move it axially to the left as depicted in FIGURE 1. The fluid means 70 is adapted to be disposed around the coacting bearing elements and is drawn in between the bearing elements on the intake stroke analogous to FIGURE 4A and pumped out between the bearing elements on the compression stroke analogous to FIGURE 4B. The intake stroke for the bearing assembly depicted in FIGURE 1 is when the central portion 83 is pulled to the right by the motor means and the compression stroke is when central section 83 moves to the left or toward the bearing element 76.

A baffle element 92 analogous to the baffles 30 and 30' of FIGURE 3 is provided at each end of the housing 61 to minimize any fluid currents from imparting undesired torques to the gimbal assembly 62.

While ball and socket type arrangements have been depicted in FIGURES 1 and 3, it will be understood that the scope of the invention covers other arrangements. One modified arrangement is that depicted in FIGURES 4A and 4B wherein the socket or concave recess has a conical shape. It will be further understood that while the convex members have been shown connected to the gimbal and the concave elements connected to the housing, these bearing elements may be reversed if desired. In other words the concave element may be attached or connected to the gimbal while the convex member may be connected to the housing.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In a floated inertial instrument: a housing member; a gimbal member positioned within said housing member; fluid means in said housing member and surrounding said gimbal member, said fluid means having a density substantially equal to the density of said gimbal member; means rotatably connecting said gimbal member to said housing member for relative rotation therewith about an axis comprising a pair of axially spaced bearing assemblies each including a pivot element connected to one of said members, a pivot receiving element connected to the other of said members, and means for axially oscillating said elements relative to one another so as to pump said fluid means between said elements; and baffle means positioned between said gimbal member and said oscillation producing means.

2. In a sensitive instrument: a first member, a second member; and means for supporting said second member on said first member for relative rotation therebetween about a rotational axis, said supporting means comprising a pair of bearing assemblies axially spaced along said axis and each assembly haivng a pivot element connected to one of said members, a recessed bearing receiving element encompassing said pivot element and connected to the other of said members, fluid means, and motor means connected to one of said elements and adapted to axially oscillate said elements relative to one another so as to pump said fluid means between said elements.

3. In a floated inertial instrument: a housing member; a gimbal member positioned within said housing member; fluid means in said housing member and surrounding said gimbal member; and means rotatably connecting said gimbal member to said housing member for relative rotation therewith about an axis comprising a pair of axially spaced bearing assemblies each including a pivot element connected to one of said members, a pivot receiving element connected to the other of said members, and motor means connected to one of said elements for axially oscillating said elements relative to one another so as to pump said fluid means between said elements.

4. In a sensitive instrument: a first member; a second member; and means rotatably connecting said first member to said second member for relative rotation therewith about an axis comprising a pair of axially spaced bearing assemblies each including a pivot element connected to one of said members, a pivot receiving element connected to the other of said members, fluid means, and means for axially oscillating said elements relative to one another so as to pump said fluid means between said elements.

5. In a sensitive instrument: a first member; a second member; and means rotatably connecting said first member to said second member for relative rotation therewith about an axis comprising a pivot element connected to one of said members, a pivot receiving element connected to the other of said members, fluid means, and means for oscillating said elements relative to one another so as to pump said fluid means between said elements.

6. In a floated inertial instrument: a housing member; a gimbal member positioned within said housing member; fluid means in said housing member and surrounding said gimbal member, said fluid means having a density substantially equal to the density of said gimbal member; and means rotatably connecting said gimbal member to said housing member for relative rotation therewith about an axis comprising a pair of axially spaced bearing assemblies each including a pivot element connected to one of said members, a pivot receiving element connected to the other of said members, one of said elements having a concave shape, the other of said elements having a convex shape generally conforming to the concave shape of said one of said elements, and said elements being positioned so that said convex shaped element is generally nested within said concave shaped element, and means for axially oscillating said elements relative to one another so as to pump said fluid means between said elements.

7. In a floated inertial instrument: a housing member; a gimbal member positioned within said housing member; fluid means in said housing member and surrounding said gimbal member; and means rotatably connecting said gimbal member to said housing member for relative rotation therewith about an axis comprising a pair of axially spaced bearing assemblies each including a pivot element connected to one of said members, a pivot receiving element connected to the other of said members, one of said elements having a concave shape, the other of said elements having a convex shape, and said elements being positioned so that the convex shaped element is generally nested within the concave shaped element, and means for axially oscillating said elements relative to one another so as to pump said fluid means between said elements.

8. In a sensitive instrument: a first member; a second member; and means rotatably connecting said first member to said second member for relative rotation therewith about an axis comprising a pair of axially spaced bearing assemblies each including a pivot element connected to one of said members, a pivot receiving element connected to the other of said members, one of said elements having a concave shape, the other of said elements having a convex shape, and said elements being positioned so that said convex shaped element is generally nested within said concave shaped element, fluid means, and means for axially oscillating said elements relative to one another so as to pump said fluid means between said elements.

9. In a floated inertial instrument: a housing member; a gimbal member positioned within said housing member; fluid means in said housing member and surrounding said gimbal member, said fluid means having a density substantially equal to the density of said gimbal member; and means rotatably connecting said gimbal member to said housing member for relative rotation therewith about an axis comprising a pair of axially spaced bearing assemblies each including a pivot element connected to one of said members, a pivot receiving element connected to the other of said members, and means for oscillating said elements relative to one another so as to pump said fluid means between said elements.

References Cited in the file of this patent

FOREIGN PATENTS

| | | |
|---|---|---|
| 854,507 | Great Britain | Nov. 23, 1960 |
| 854,508 | Great Britain | Nov. 23, 1960 |